United States Patent
Jozwicki (10) Patent No.: US 12,269,558 B1
(45) Date of Patent: Apr. 8, 2025

(54) RECUMBENT TRICYCLE ASSEMBLY

(71) Applicant: Mark Jozwicki, Portage, MI (US)

(72) Inventor: Mark Jozwicki, Portage, MI (US)

( * ) Notice: Subject to any disclaimer, the term of this patent is extended or adjusted under 35 U.S.C. 154(b) by 0 days.

(21) Appl. No.: 18/610,498

(22) Filed: Mar. 20, 2024

(51) Int. Cl.
| | |
|---|---|
| *B62K 5/027* | (2013.01) |
| *B62D 61/06* | (2006.01) |
| *B62J 3/12* | (2020.01) |
| *B62J 6/022* | (2020.01) |
| *B62J 6/045* | (2020.01) |
| *B62J 6/056* | (2020.01) |
| *B62J 25/00* | (2020.01) |
| *B62J 27/30* | (2020.01) |
| *B62J 29/00* | (2006.01) |
| *B62J 35/00* | (2006.01) |
| *B62J 43/30* | (2020.01) |
| *B62K 5/05* | (2013.01) |
| *B62K 5/06* | (2006.01) |
| *B62K 5/08* | (2006.01) |
| *B62K 23/06* | (2006.01) |

(Continued)

(52) U.S. Cl.
CPC ............. *B62K 5/027* (2013.01); *B62D 61/065* (2013.01); *B62J 3/12* (2020.02); *B62J 6/022* (2020.02); *B62J 6/045* (2020.02); *B62J 6/056* (2020.02); *B62J 25/00* (2013.01); *B62J 27/30* (2020.02); *B62J 29/00* (2013.01); *B62J 35/00* (2013.01); *B62J 43/30* (2020.02); *B62K 5/05* (2013.01); *B62K 5/06* (2013.01); *B62K 5/08* (2013.01); *B62K 23/06* (2013.01); *B62L 1/00* (2013.01); *B62L 3/02* (2013.01); *B62M 19/00* (2013.01); *B60G 2300/122* (2013.01); *B60Y 2200/13* (2013.01); *B62K 2005/001* (2013.01)

(58) Field of Classification Search
CPC .......... B62K 5/027; B62K 5/02; B62K 5/023; B62K 5/025; B62K 5/05; B62K 5/06; B62K 5/08; B62K 5/00; B62K 23/06; B62K 3/005; B62K 2005/001; B62K 2204/00; B62K 9/02; B60G 2300/122; B62D 61/06; B62D 61/065; B60Y 2200/13; B62J 3/12
USPC .................................. 180/210; 280/282, 267
See application file for complete search history.

(56) References Cited

U.S. PATENT DOCUMENTS

| | | | |
|---|---|---|---|
| 3,429,584 A | 2/1969 | Hendricks | |
| 4,020,914 A | 5/1977 | Trautwein | |

(Continued)

FOREIGN PATENT DOCUMENTS

| | | | | |
|---|---|---|---|---|
| DE | 102010004702 A1 | * | 7/2011 | ................ B62J 6/02 |
| GB | 2561227 A | * | 10/2018 | .............. B62J 15/00 |
| JP | 2004306739 A | * | 11/2004 | |

*Primary Examiner* — Keith J Frisby (57) ABSTRACT

A recumbent tricycle assembly for safely and comfortably riding in a reclined position includes a frame having a front portion that is pivotably coupled to a rear portion. A wheel assembly is rotatably coupled to the frame. The wheel assembly includes a pair of front wheels and a rear wheel. A steering assembly includes a left-hand grip bar and a right-hand grip bar. Manipulation of the left-hand grip bar and the right-hand grip bar steers the frame. A seat is positioned between the front wheels and the grip bars such that each of the left-hand grip bar and the right-hand grip bar is accessible to the user when sitting in the seat. A drive assembly mechanically coupled to the wheel assembly rotates the pair of front wheels and the rear wheel. A brake assembly coupled to the wheel assembly halts rotation of the wheel assembly.

17 Claims, 6 Drawing Sheets

(51) Int. Cl.
  *B62L 1/00*   (2006.01)
  *B62L 3/02*   (2006.01)
  *B62M 19/00*  (2006.01)
  *B62K 5/00*       (2013.01)

(56) References Cited

U.S. PATENT DOCUMENTS

| | | | | |
|---|---|---|---|---|
| 4,222,040 | A * | 9/1980 | Benson | G10K 9/12 |
| | | | | 340/384.4 |
| 4,674,762 | A * | 6/1987 | Nelson | B62K 5/00 |
| | | | | 280/282 |
| 8,720,927 | B2 | 5/2014 | Ball | |
| 9,061,725 | B1 * | 6/2015 | Nania | B62K 13/00 |
| 9,359,034 | B2 | 6/2016 | Rasmussen | |
| 11,142,274 | B1 * | 10/2021 | Thompson | B62K 3/02 |
| 2007/0045020 | A1 | 3/2007 | Martino | |
| 2015/0329165 | A1 * | 11/2015 | Page | B62K 5/02 |
| | | | | 180/205.1 |
| 2016/0229478 | A1 | 8/2016 | Stephani | |
| 2016/0264214 | A1 * | 9/2016 | Rasmussen | B62M 25/04 |
| 2021/0362797 | A1 * | 11/2021 | Botha | B62M 6/45 |

\* cited by examiner

RECUMBENT TRICYCLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to motorized tricycles and more particularly pertains to a new motorized tricycle for safely and comfortably riding in a reclined position.

(2) Description of Related Art Including Information Disclosed Under 37 CFR 1.97 and 1.98

The prior art relates to motorized tricycles. Three-wheeled vehicles typically include a centrally positioned driver's seat with a steering wheel positioned in front of the driver's seat and a pair of pedals positioned in front of the driver's seat. The pair of pedals may be coupled to the motor, for motorized transit, or may be pedals for manually propelling the tricycle. Such vehicles are difficult, or impossible, to operate for individuals who are handicapped or disabled. For example, if a person has limited mobility with their legs, that person may be unable to use the pedals on a standard three-wheeled vehicle. Thus, there is a need in the art for a motorized tricycle that can be operated using hand controls instead of pedals.

BRIEF SUMMARY OF THE INVENTION

An embodiment of the disclosure meets the needs presented above by generally comprising a frame having a front portion that is pivotably coupled to a rear portion. A wheel assembly is rotatably coupled to the frame. The wheel assembly includes a pair of front wheels that is positioned on the front portion and a rear wheel that is positioned on the rear portion. A steering assembly is coupled to the frame to steer the frame. The steering assembly comprises a left-hand grip bar that is positioned on a left side of the front portion and a right-hand grip bar that is positioned on a right side of the front portion. Manipulation of the left-hand grip bar and the right-hand grip bar steers the frame. A seat is mounted to the frame. The seat positions the user adjacent to the pair of front wheels, facing outwardly past the front portion, while the user is in a recumbent position. The seat is positioned between the left-hand grip bar and the right-hand grip bar such that each of the left-hand grip bar and the right-hand grip bar is accessible to the user when the user is sitting in the seat. A drive assembly is mechanically coupled to the wheel assembly to rotate the pair of front wheels and the rear wheel thereby propelling the frame in a forward direction or a reverse direction. A brake assembly is coupled to the wheel assembly whereby the brake assembly halts rotation of the wheel assembly thereby stopping the frame from being propelled in the forward direction or the reverse direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new motorized tricycle embodying the principles and concepts of an embodiment of the disclosure and generally designated by the reference numeral 10 will be described.

As best illustrated in FIGS. 1 through 7, the recumbent tricycle assembly 10 generally comprises a frame 12 having a front portion 14 being pivotably coupled to a rear portion 16.

A wheel assembly 18 is rotatably coupled to the frame 12. The wheel assembly 18 generally comprises a pair of front wheels 20 that is positioned on the front portion 14 and a rear wheel 22 that is positioned on the rear portion 16. Each of the pair of front wheels 20 may have a diameter that is larger than a diameter of the rear wheel 22. Alternatively, all of the wheels may have the same diameter, or the rear wheel 22 may have a diameter that is larger than each of the pair of front wheels 20. Each of the pair of front wheels 20 and the rear wheel 33 may include an all-terrain tire.

A steering assembly 24 is coupled to the frame 12 to steer the frame 12. The steering assembly 24 may comprise a left-hand grip bar 26 that is positioned on a left side of the front portion 14 and a right-hand grip bar 28 that is positioned on a right side of the front portion 14. Manipulation of the left-hand grip bar 26 and the right-hand grip bar 28 steers the frame 12.

A left control arm 30 may couple the left-hand grip bar 26 to a left one of the pair of front wheels 20. The left control arm 30 pivots the left one of the pair of front wheels 20 when a user 110 pushes forward on the left-hand grip bar 26.

A right control arm 32 may couple the right-hand grip bar 28 to a right one of the pair of front wheels 20. The right control arm 32 pivots the right one of the pair of front wheels 20 when the user 110 pushes forward on the right-hand grip bar 28.

Each of the left control arm 30 and the right control arm 32 may include a first end 34 that is pivotably coupled to a rod 36. A steering spindle 38 may be pivotably coupled to the rod 36. The steering spindle 38 may include a knuckle joint 40 that is pivotably coupled to a respective one of the pair of front wheels 20. A steering rack or mechanical device may also be included to facilitate the left control arm 30 and the right control arm 32 in pivoting the pair of front wheels 20 to the left or to the right. For example, a rack and pinion steering assembly could be used to manipulate the direction of the pair of front wheels 20.

Figure 1:
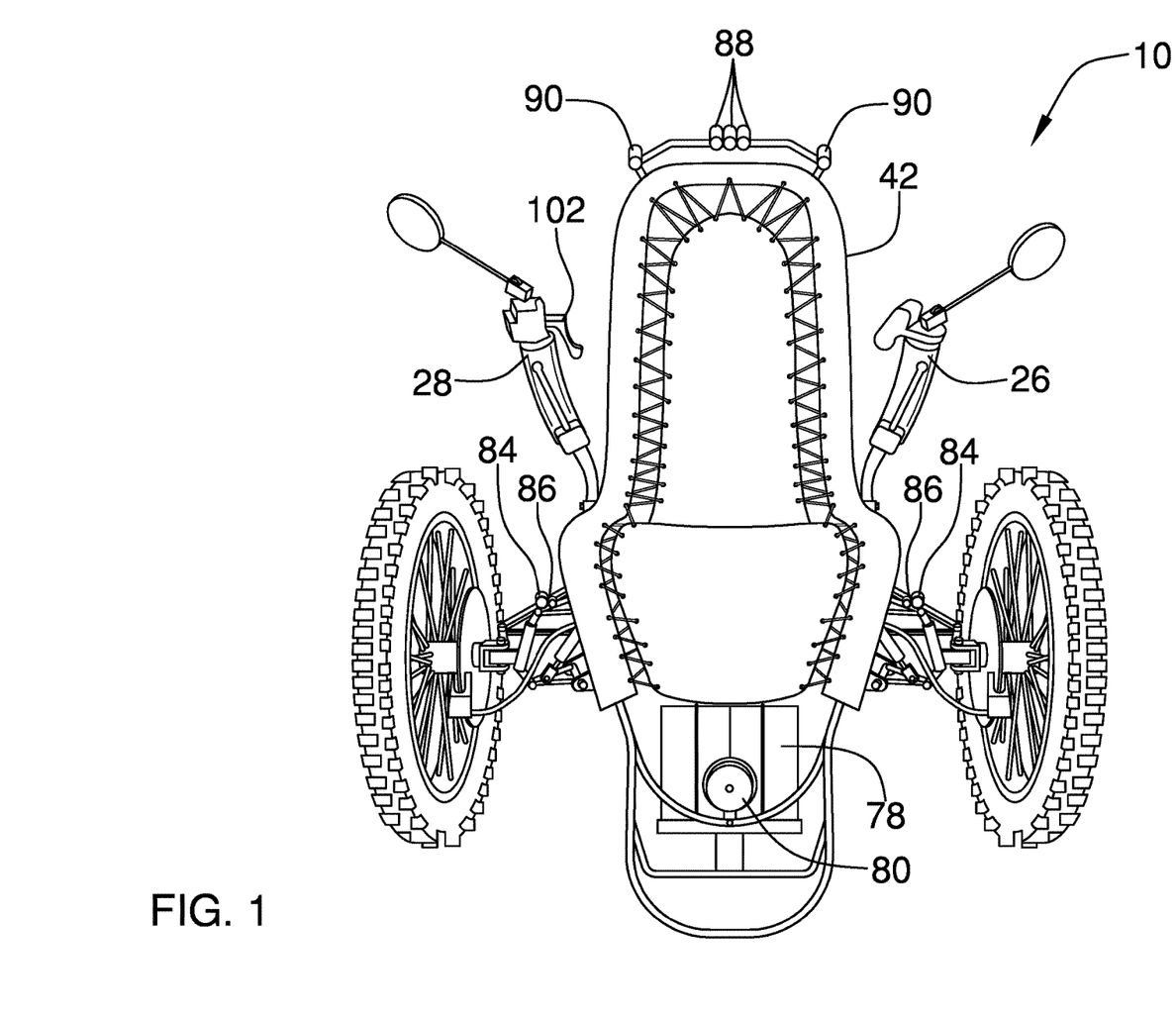
FIG. 1 is a front isometric view of a recumbent tricycle assembly according to an embodiment of the disclosure.
Figure 2:
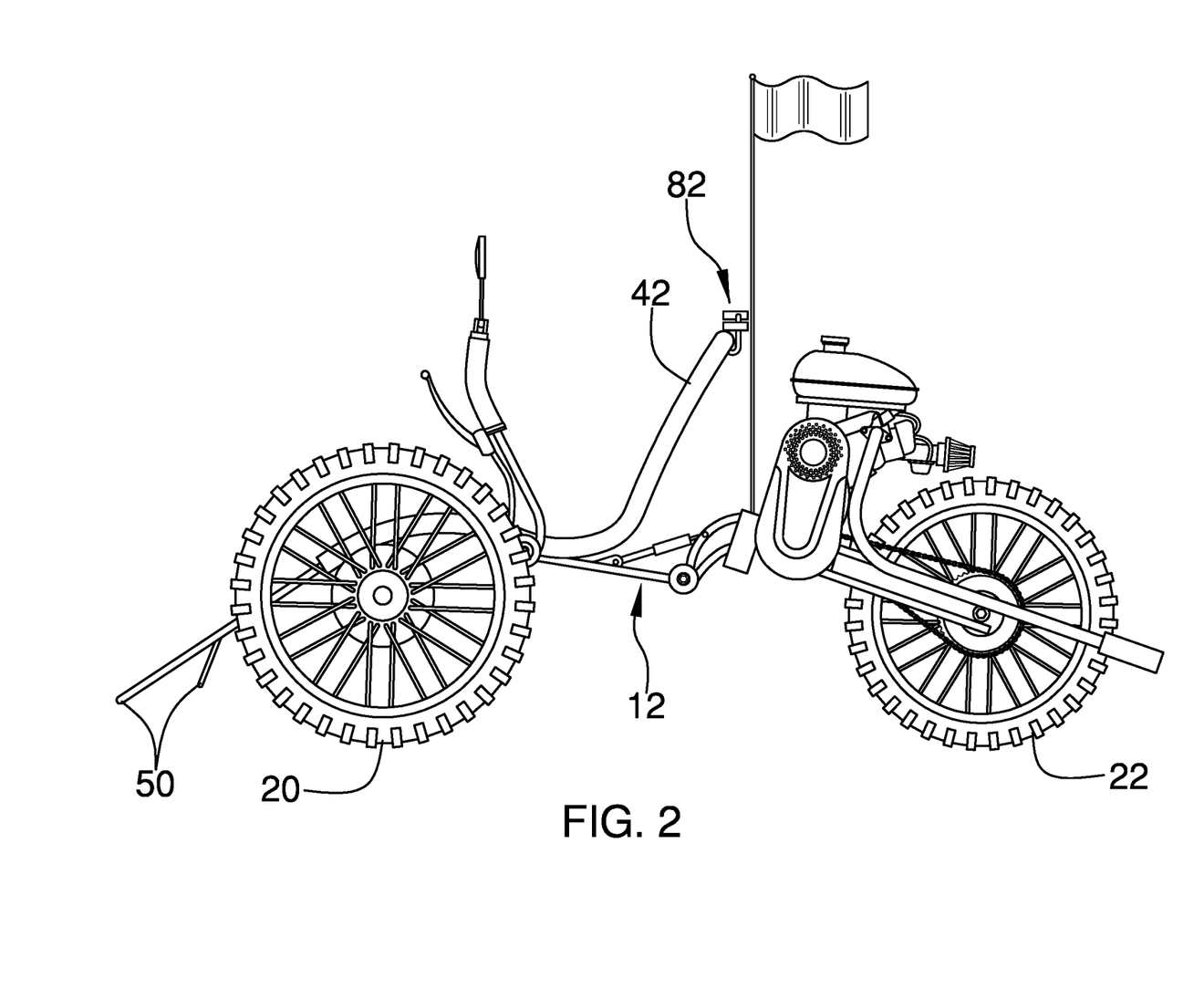
FIG. 2 is a side view of an embodiment of the disclosure.
Figure 3:
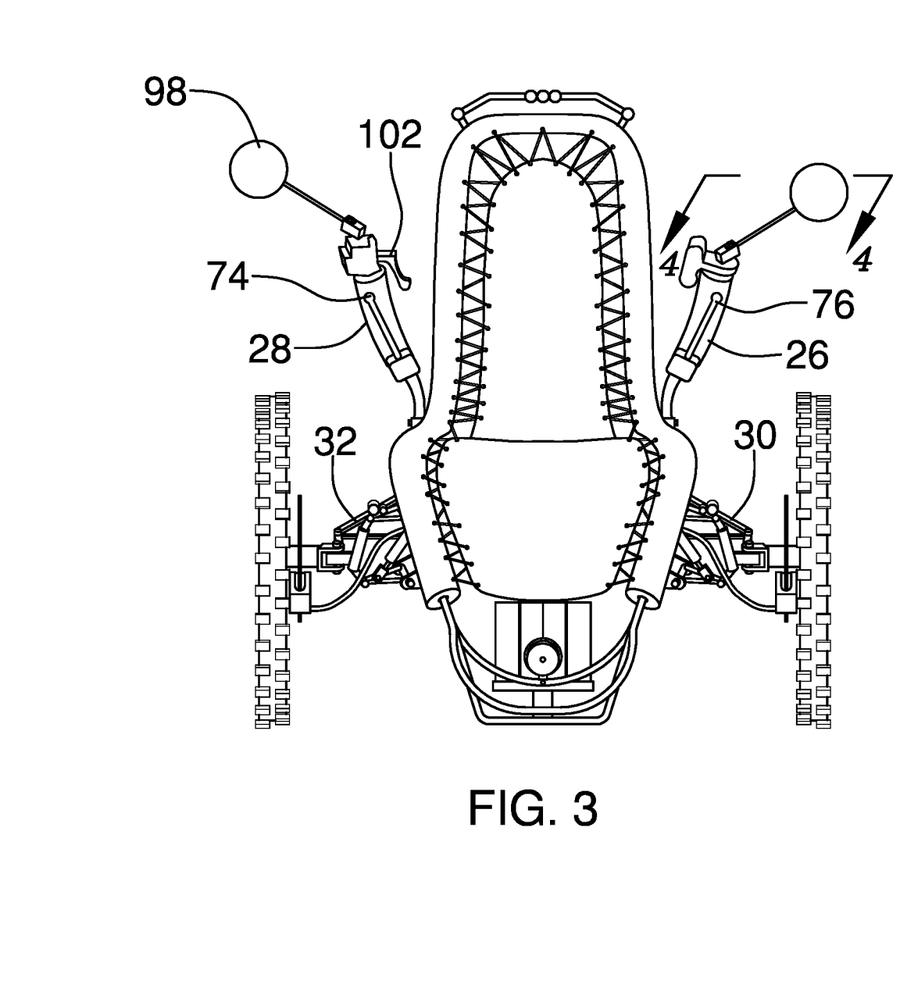
FIG. 3 is a front view of an embodiment of the disclosure.
Figure 4:
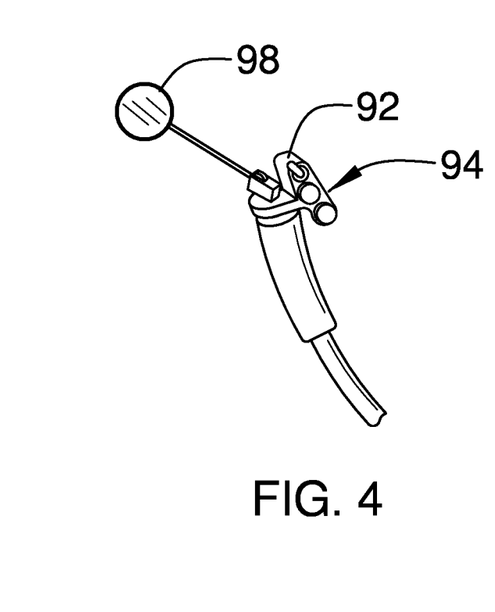
FIG. 4 is a detail view of an embodiment of the disclosure.
Figure 5:
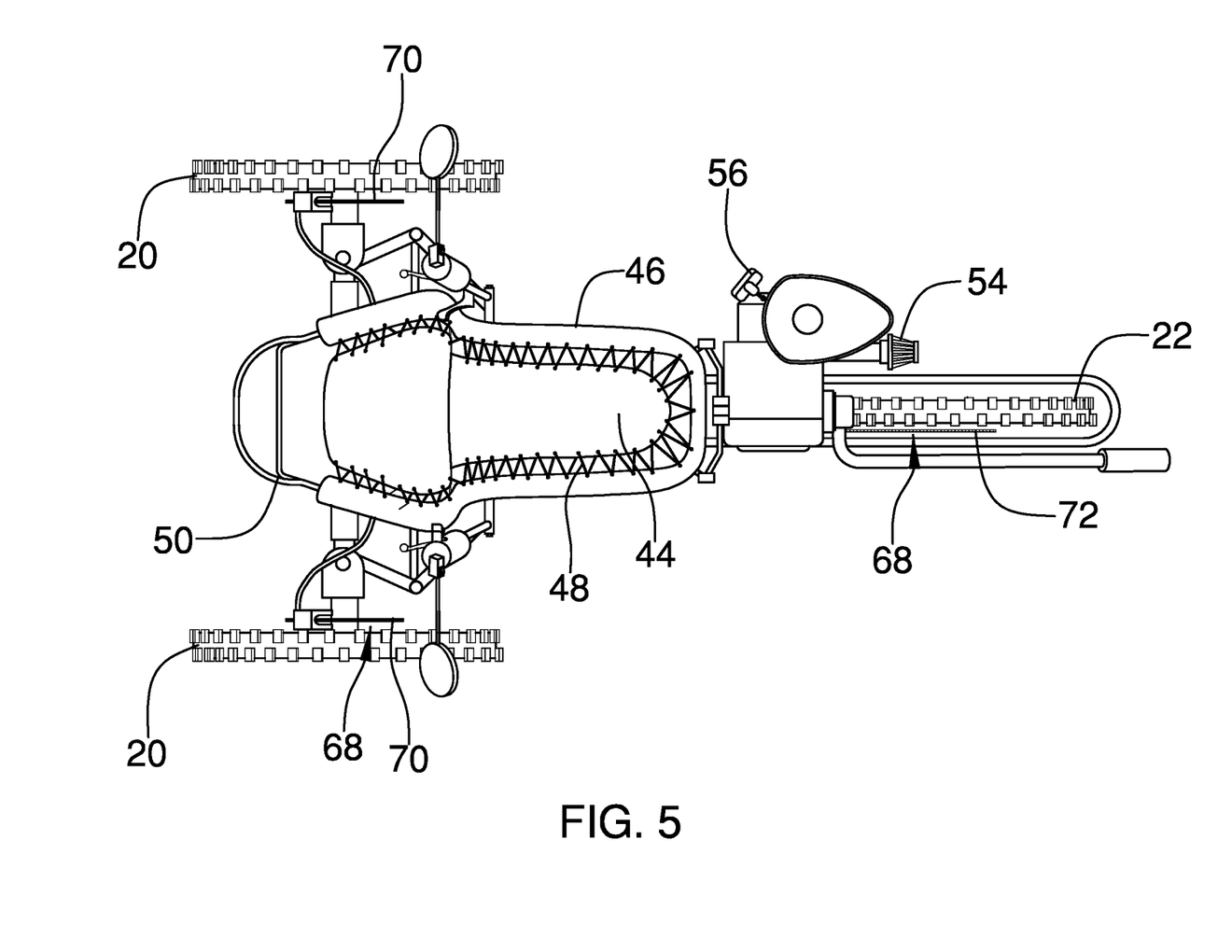
FIG. 5 is a top view of an embodiment of the disclosure.
Figure 6:
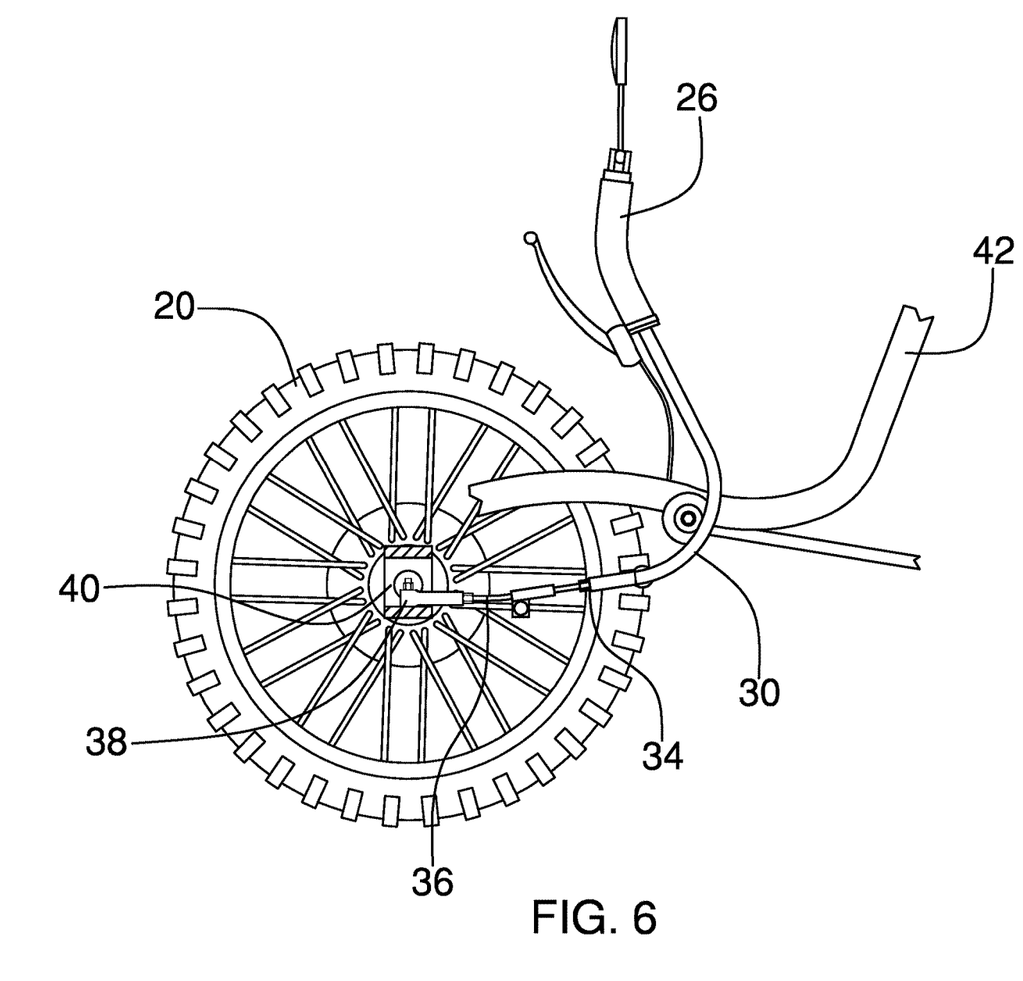
FIG. 6 is a detail view of an embodiment of the disclosure.
Figure 7:
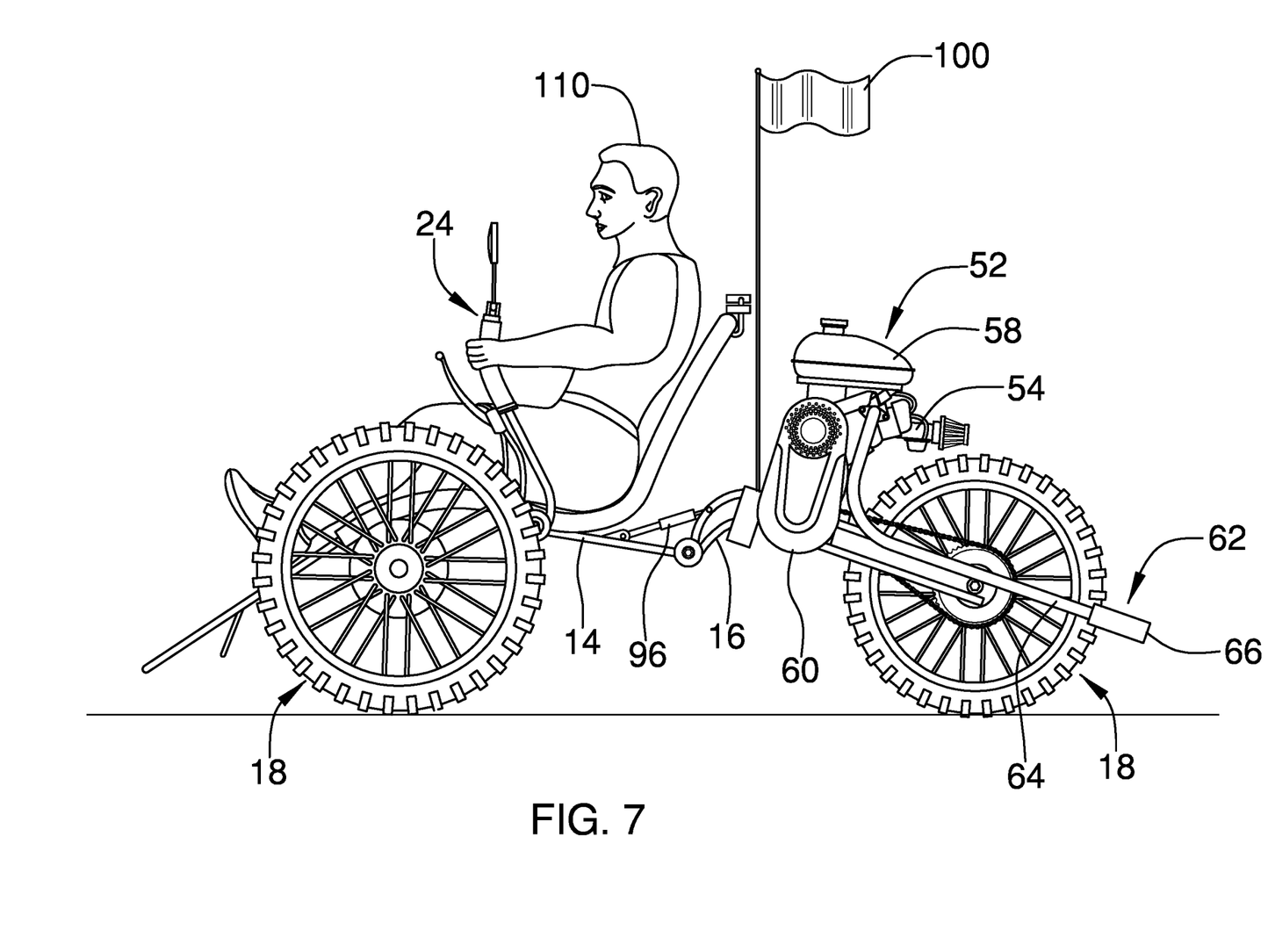
FIG. 7 is an in-use view of an embodiment of the disclosure.

A seat 42 is mounted to the frame 12. The seat 42 is configured to position the user 110 adjacent to the pair of front wheels 20 such that the user 110 is facing outwardly past the front portion 14 while the user 110 is in a recumbent position. The seat 42 is positioned between the left-hand grip bar 26 and the right-hand grip bar 28 such that each of the left-hand grip bar 26 and the right-hand grip bar 28 is accessible to the user 110 when the user 110 is sitting in the seat 42. In some embodiments, the seat may be positioned between the pair of front wheels 20 such that the user 110 is facing outwardly past the front portion 14 while the user 110 is in a recumbent position centered between the pair of front wheels 20. In other words, the user 110 may be reclined between the pair of front wheels 20, with the body of the user 110 centered between the pair of front wheels 20. As shown in FIG. 7, the legs of the user 110 may extend outwardly from the body of the user 110 between the pair of front wheels 20.

The seat 42 may include a seat panel 44 that is configured to receive a body of the user 110. A sleeve 46 may receive the frame 12 around the seat panel 44. A webbing 48 may couple the seat panel 44 to the sleeve 46. The webbing 48 is generally configured to absorb an impact from the frame 12 thereby reducing the force of the impact on the user 110. A footrest 50 may extend outwardly from the front portion 14 of the frame 12 between the pair of front wheels 20. The footrest 50 may be aligned with the seat panel 44 for receiving and supporting a foot of the user 110.

A drive assembly 52 is mechanically coupled to the wheel assembly 18 to rotate the pair of front wheels 20 and the rear wheel 22 thereby propelling the frame 12 in a forward direction or in a reverse direction. For example, the drive assembly 52 may rotate the pair of front wheels 20 and the rear wheel 22 in a first direction, such as clockwise, to propel the frame 12 in the forward direction. The drive assembly 52 may rotate the pair of front wheels 20 and the rear wheel 22 in the opposite direction, such as counterclockwise, to propel the frame 12 in the reverse direction. The drive assembly 52 may comprise an engine 54. The engine 54 may include a pull cord 56, a switch, or a button for actuating the engine 54.

A fuel tank 58 may be fluidly coupled to the engine 54. The fuel tank 58 is generally configured to hold a fuel for powering the engine 54. Alternatively, an engine battery or alternative power source may be electrically coupled to the engine 54 for powering the engine 54. For example, the engine 54 may comprise an electric motor powered by a battery. In embodiments where the engine 54 comprises an electric motor, the fuel tank 58 may comprise a battery.

A torque converter 60 may couple the engine 54 to the wheel assembly 18. The torque converter 60 transfers power from the engine 54 to the wheel assembly 18.

An exhaust 62 may be coupled to the engine 54. The exhaust 62 generally includes an exhaust pipe 64 having an outlet edge 66 that is positioned proximate to the rear wheel 22. The outlet edge 66 defines an opening into the exhaust pipe 64. The exhaust 62 is generally configured to expel a gas outwardly through the opening of the exhaust pipe 64.

A throttle 102 may be mechanically coupled to the engine 54 and the fuel tank 58. The throttle 102 may be pivotably coupled to the steering assembly 24. For example, the throttle 102 may be positioned on one of the right-hand grip bar 28 and the left-hand grip bar 26. The throttle 102 draws fuel from the fuel tank 58 into the engine 54 when the user 110 pivots the throttle 102 forward.

A brake assembly 68 is coupled to the wheel assembly 18. The brake assembly 68 halts rotation of the wheel assembly 18 thereby stopping the frame 12 from being propelled in the forward direction or in the reverse direction.

The brake assembly 68 may comprise a pair of front brakes 70 and a rear brake 72. Each of the pair of front brakes 70 is mounted to a respective one of the pair of front wheels 20. Each of the pair of front brakes 70 may comprise a disc brake. The rear brake 72 is mounted to the rear wheel 22. The rear brake 72 may also comprise a disc brake.

A front brake control 74 is mechanically coupled to each of the pair of front brakes 70 for actuating the pair of front brakes 70. The front brake control 74 may be positioned on the right-hand grip bar 28 or the left-hand grip bar 26. A rear brake control 76 is mechanically coupled to the rear brake 72 for actuating the rear brake 72. The rear brake control 76 may be positioned on the left-hand grip bar 26 or the right-hand grip bar 28.

A power source 78 may be coupled to the frame 12. The power source 78 may be a battery and may be positioned beneath the seat 42 between the pair of front wheels 20. The power source 78 may be electrically coupled to the engine 54 for powering the engine, for example as an additional source of power to the fuel tank 58 or as a replacement of the fuel tank 58. For example, the power source 78 may comprise a battery pack for storing energy for the electric drive motor that transfers power to the wheel assembly 18.

A horn 80 may be electronically coupled to the power source 78. The horn 80 is configured to audibly emit a noise. The horn 80 may be mounted to the power source 78 and positioned beneath the seat 42 between the pair of front wheels 20.

A lighting assembly 82 may be electronically coupled to the power source 78. The lighting assembly 82 is configured to facilitate visibility of the frame 12. For example, the lighting assembly 82 may comprise a headlight 84 that is coupled to the frame 12. The headlight 84 is generally positioned on and directed outwardly from the front portion 14. A pair of turn signal lights 86 may also be coupled to the frame 12. Each of the pair of turn signal lights 86 may be positioned adjacent to a respective one of the pair of front wheels 20. A taillight 88 may be coupled to the seat 42 and directed outwardly toward the rear portion 16. A brake light 90 may be coupled to the seat 42 and directed outwardly toward the rear portion 16.

A control panel 92 may be electronically coupled to the power source 78. The control panel 92 may comprise a plurality of buttons 94 being positioned on the steering assembly 42. For example, the plurality of buttons 94 may be positioned on the left-hand grip bar 26 or the right-hand grip bar 28. Each of the plurality of buttons 94 is generally actuatable to control a respective one of the pair of turn signal lights 86, the headlight 84, and the horn 80.

A shocks assembly 96 may be coupled to the frame 12. The shocks assembly 96 may be positioned between the front portion 14 and the rear portion 16. The shocks assembly 96 is generally configured to absorb an impact from the frame 12 thereby reducing a force of the impact to the user 110.

A pair of mirrors 98 may be directed toward the rear portion 16 of the frame 12. The pair of mirrors 98 is configured to provide a view of an area behind the seat 42 when the user 110 is sitting in the seat 42. Each of the pair of mirrors 98 may be mounted to a respective one of the left-hand grip bar 26 and the right-hand grip bar 28. In alternative embodiments, a single mirror may be mounted to one of the left-hand grip bar 26 and the right-hand grip bar 28 and directed toward the rear portion 16 of the frame 12 to provide the view of the area behind the seat 42 for the user 110.

A flag 100 may be coupled to and extend upwardly from the frame 12. For example, the flag 100 may be positioned behind the seat 42. The flag 100 may comprise a fluorescent color and is generally configured to facilitate visibility of the frame 12. For example, the flag 100 may be a safety flag.

In use, the user 110 can sit in a comfortably reclined, recumbent position on the seat 42. The user 110 can grasp the steering assembly 24 to control the direction of movement of the frame 12 as the wheel assembly 18 propels the frame 12 in the forward direction or the reverse direction. All of the controls that the user 110 needs are positioned on or adjacent to the steering assembly 24, so the user 110 can control the recumbent tricycle assembly 10 using only their hands and arms. For example, the user 110 can increase the speed of the frame 12 by pushing on the throttle 102, can slow the speed of the frame 12 by using the front brake control 74 and rear brake control 76, and can actuate the lighting assembly 82 and horn 80 using the control panel 92.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorized recumbent tricycle comprising:
    a frame having a front portion being pivotably coupled to a rear portion;
    a wheel assembly being rotatably coupled to the frame, the wheel assembly comprising:
        a pair of front wheels being positioned on the front portion;
        a rear wheel being positioned on the rear portion;
    a steering assembly being coupled to the frame to steer the frame, the steering assembly comprising:
        a left-hand grip bar being positioned on a left side of the front portion;
        a right-hand grip bar being positioned on a right side of the front portion;
        wherein manipulation of the left-hand grip bar and the right-hand grip bar steers the frame;
    a seat being mounted to the frame, the seat being configured to position a user adjacent to the pair of front wheels and facing outwardly past the front portion while the user is in a recumbent position, the seat being positioned between the left-hand grip bar and the right-hand grip bar such that each of the left-hand grip bar and the right-hand grip bar is configured to be accessible to the user when the user is sitting in the seat;
    a drive assembly being mechanically coupled to the wheel assembly to rotate the pair of front wheels and the rear wheel thereby propelling the frame in a forward direction;
    a brake assembly being coupled to the wheel assembly whereby the brake assembly halts rotation of the wheel assembly thereby stopping the frame from being propelled in the forward direction;
    the steering assembly further comprising:
        a left control arm coupling the left-hand grip bar to a left one of the pair of front wheels, wherein the left control arm pivots the left one of the pair of front wheels when the user pushes forward on the left-hand grip bar; and
        a right control arm coupling the right-hand grip bar to a right one of the pair of front wheels, wherein the right control arm pivots the right one of the pair of front wheels when the user pushes forward on the right-hand grip bar;
        each of the left control arm and the right control arm further comprising a first end being pivotably coupled to a rod; and
    a steering spindle being pivotably coupled to the rod, the steering spindle including a knuckle joint being pivotably coupled to a respective one of the pair of front wheels.

2. The motorized recumbent tricycle of claim 1, wherein each of the pair of front wheels has a diameter that is larger than a diameter of the rear wheel.

3. The motorized recumbent tricycle of claim 1, the seat further comprising:
    a seat panel being configured to receive a body of the user;
    a sleeve receiving the frame around the seat panel; and
    a webbing coupling the seat panel to the sleeve, the webbing being configured to absorb an impact from the frame.

4. The motorized recumbent tricycle of claim 1, the seat further comprising a footrest extending outwardly from the front portion of the frame between the pair of front wheels.

5. The motorized recumbent tricycle of claim 1, the drive assembly further comprising:
an engine;
a fuel tank being fluidly coupled to the engine, the fuel tank being configured to hold a fuel for powering the engine;
a torque converter coupling the engine to the wheel assembly, the torque converter transferring power from the engine to the wheel assembly;
an exhaust being coupled to the engine, the exhaust including an exhaust pipe having an outlet edge being positioned proximate to the rear wheel, the outlet edge defining an opening into the exhaust pipe, the exhaust being configured to expel a gas outwardly through the opening of the exhaust pipe; and
a throttle being mechanically coupled to the engine and the fuel tank, the throttle being pivotably coupled to the steering assembly wherein the throttle draws fuel from the fuel tank into the engine when the user pivots the throttle forward.

6. The motorized recumbent tricycle of claim 1, the brake assembly further comprising:
a pair of front brakes, each of the pair of front brakes being mounted to a respective one of the pair of front wheels;
a rear brake being mounted to the rear wheel;
a front brake control being mechanically coupled to each of the pair of front brakes, the front brake control being positioned on the right-hand grip bar; and
a rear brake control being mechanically coupled to the rear brake, the rear brake control being positioned on the left-hand grip bar.

7. The motorized recumbent tricycle of claim 6, each of the pair of front brakes and the rear brake further comprising a disc brake.

8. The motorized recumbent tricycle of claim 1, further comprising a power source being coupled to the frame.

9. The motorized recumbent tricycle of claim 8, further comprising a horn being electronically coupled to the power source, the horn being configured to audibly emit a noise.

10. The motorized recumbent tricycle of claim 9, further comprising a control panel being electronically coupled to the power source, the control panel comprising a button being actuatable to control the horn.

11. The motorized recumbent tricycle of claim 9, wherein each of the horn and the power source is positioned beneath the seat between the pair of front wheels.

12. The motorized recumbent tricycle of claim 8, further comprising a lighting assembly being electronically coupled to the power source, the lighting assembly being configured to facilitate visibility of the frame.

13. The motorized recumbent tricycle of claim 12, the lighting assembly further comprising:
a headlight being coupled to the frame, the headlight being positioned on and directed outwardly from the front portion;
a pair of turn signal lights being coupled to the frame, each of the pair of turn signal lights being positioned adjacent to a respective one of the pair of front wheels;
a taillight being coupled to the seat, the taillight being directed outwardly toward the rear portion; and
a brake light being coupled to the seat, the brake light being directed outwardly toward the rear portion.

14. The motorized recumbent tricycle of claim 13, further comprising a control panel being electronically coupled to the power source, the control panel comprising a plurality of buttons, each of the plurality of buttons being actuatable to control a respective one of the pair of turn signal lights and the headlight.

15. The motorized recumbent tricycle of claim 1, further comprising a shocks assembly being coupled to the frame, the shocks assembly being positioned between the front portion and the rear portion, the shocks assembly being configured to absorb an impact from the frame.

16. The motorized recumbent tricycle of claim 1, further comprising a mirror being directed toward the rear portion of the frame whereby the mirror is configured to provide a view of an area behind the seat when the user is sitting in the seat, the mirror being mounted to one of the left-hand grip bar and the right-hand grip bar.

17. A motorized recumbent tricycle comprising:
a frame having a front portion being pivotably coupled to a rear portion;
a wheel assembly being rotatably coupled to the frame, the wheel assembly comprising:
a pair of front wheels being positioned on the front portion;
a rear wheel being positioned on the rear portion;
each of the pair of front wheels and the rear wheel including an all-terrain tire;
a steering assembly being coupled to the frame to steer the frame, the steering assembly comprising:
a left-hand grip bar being positioned on a left side of the front portion;
a right-hand grip bar being positioned on a right side of the front portion;
wherein manipulation of the left-hand grip bar and the right-hand grip bar steers the frame;
a left control arm coupling the left-hand grip bar to a left one of the pair of front wheels, wherein the left control arm pivots the left one of the pair of front wheels when a user pushes forward on the left-hand grip bar;
a right control arm coupling the right-hand grip bar to a right one of the pair of front wheels, wherein the right control arm pivots the right one of the pair of front wheels when the user pushes forward on the right-hand grip bar;
each of the left control arm and the right control arm including a first end being pivotably coupled to a rod;
a steering spindle being pivotably coupled to the rod, the steering spindle including a knuckle joint being pivotably coupled to a respective one of the pair of front wheels;
a seat being mounted to the frame, the seat being configured to position the user between the pair of front wheels and facing outwardly past the front portion while the user is in a recumbent position centered between the pair of front wheels, the seat being positioned between the left-hand grip bar and the right-hand grip bar such that each of the left-hand grip bar and the right-hand grip bar is configured to be accessible to the user when the user is sitting in the seat, the seat including:
a seat panel being configured to receive a body of the user;
a sleeve receiving the frame around the seat panel;

a webbing coupling the seat panel to the sleeve, the webbing being configured to absorb an impact from the frame;

a footrest extending outwardly from the front portion of the frame between the pair of front wheels, the footrest being aligned with the seat panel;

a drive assembly being mechanically coupled to the wheel assembly to rotate the pair of front wheels and the rear wheel thereby selectively propelling the frame in a forward direction and a reverse direction, the drive assembly comprising:

an engine, the engine including a pull cord for actuating the engine;

a fuel tank being fluidly coupled to the engine, the fuel tank being configured to hold a fuel for powering the engine;

a torque converter coupling the engine to the wheel assembly, the torque converter transferring power from the engine to the wheel assembly;

an exhaust being coupled to the engine, the exhaust including an exhaust pipe having an outlet edge being positioned proximate to the rear wheel, the outlet edge defining an opening into the exhaust pipe, the exhaust being configured to expel a gas outwardly through the opening of the exhaust pipe;

a throttle being mechanically coupled to the engine and the fuel tank, the throttle being pivotably coupled to the right-hand grip bar wherein the throttle draws fuel from the fuel tank into the engine when the user pivots the throttle forward;

a brake assembly being coupled to the wheel assembly whereby the brake assembly halts rotation of the wheel assembly thereby stopping the frame from being propelled in the forward direction and the reverse direction, the brake assembly comprising:

a pair of front brakes, each of the pair of front brakes being mounted to a respective one of the pair of front wheels, each of the pair of front brakes comprising a disc brake;

a rear brake being mounted to the rear wheel, the rear brake comprising a disc brake;

a front brake control being mechanically coupled to each of the pair of front brakes, the front brake control being positioned on the right-hand grip bar;

a rear brake control being mechanically coupled to the rear brake, the rear brake control being positioned on the left-hand grip bar;

a power source being coupled to the frame, the power source being a battery, the power source being positioned beneath the seat between the pair of front wheels;

a horn being electronically coupled to the power source, the horn being configured to audibly emit a noise, the horn being mounted to the power source and being positioned beneath the seat between the pair of front wheels;

a lighting assembly being electronically coupled to the power source, the lighting assembly being configured to facilitate visibility of the frame, the lighting assembly comprising:

a headlight being coupled to the frame, the headlight being positioned on and directed outwardly from the front portion;

a pair of turn signal lights being coupled to the frame, each of the pair of turn signal lights being positioned adjacent to a respective one of the pair of front wheels;

a taillight being coupled to the seat, the taillight being directed outwardly toward the rear portion;

a brake light being coupled to the seat, the brake light being directed outwardly toward the rear portion;

a control panel being electronically coupled to the power source, the control panel comprising a plurality of buttons being positioned on the steering assembly, each of the plurality of buttons being actuatable to control a respective one of the pair of turn signal lights, the headlight, and the horn;

a shocks assembly being coupled to the frame, the shocks assembly being positioned between the front portion and the rear portion, the shocks assembly being configured to absorb an impact from the frame;

a pair of mirrors being directed toward the rear portion of the frame whereby the pair of mirrors is configured to provide a view of an area behind the seat when the user is sitting in the seat, each of the pair of mirrors being mounted to a respective one of the left-hand grip bar and the right-hand grip bar; and a flag being coupled to and extending upwardly from the frame, the flag being positioned behind the seat, the flag comprising a fluorescent color beeing configured to facilitate visibility of the frame.

\* \* \* \* \*